(12) United States Patent
Linne

(10) Patent No.: US 10,657,607 B2
(45) Date of Patent: May 19, 2020

(54) IMPLEMENTATION OF PAYROLL SMART CONTRACT ON A DISTRIBUTED LEDGER

(71) Applicant: ADP, LLC, Roseland, NJ (US)

(72) Inventor: Anna Linne, Mendham, NJ (US)

(73) Assignee: ADP, LLC, Roseland, NJ (US)

( * ) Notice: Subject to any disclaimer, the term of this patent is extended or adjusted under 35 U.S.C. 154(b) by 354 days.

(21) Appl. No.: 15/588,607

(22) Filed: May 6, 2017

(65) Prior Publication Data

US 2018/0322588 A1    Nov. 8, 2018

(51) Int. Cl.
    *G06Q 40/00*      (2012.01)
    *H04L 29/06*      (2006.01)
    *G06Q 50/18*      (2012.01)

(52) U.S. Cl.
    CPC ........... *G06Q 40/125* (2013.12); *G06Q 50/18* (2013.01)

(58) Field of Classification Search
    CPC ........... G06Q 20/0655; G06Q 20/0658; G06Q 40/125; G06F 21/64; H04L 9/0841
    See application file for complete search history.

(56) References Cited

U.S. PATENT DOCUMENTS

| | | | | |
|---|---|---|---|---|
| 8,498,910 B1 * | 7/2013 | Grossblatt | ............ | G06Q 40/125 283/58 |
| 8,646,060 B1 | 2/2014 | Ayed | | |
| 10,296,764 B1 * | 5/2019 | Batishchev | ............. | H04L 63/00 |
| 2007/0143832 A1 | 6/2007 | Perrella et al. | | |
| 2008/0086759 A1 | 4/2008 | Colson | | |
| 2011/0225625 A1 | 9/2011 | Wolfson et al. | | |
| 2012/0060207 A1 | 3/2012 | Mardikar et al. | | |
| 2014/0130127 A1 | 5/2014 | Toole et al. | | |
| 2014/0289790 A1 | 9/2014 | Wilson | | |
| 2018/0101914 A1 * | 4/2018 | Samuel | .............. | G06Q 20/0655 |
| 2018/0225640 A1 * | 8/2018 | Chapman | ............... | G06Q 20/10 |
| 2018/0293553 A1 * | 10/2018 | Dembo | .............. | G06Q 20/0655 |
| 2019/0050832 A1 * | 2/2019 | Wright | ............... | G06Q 20/0658 |
| 2019/0052454 A1 * | 2/2019 | Wright | .................. | H04L 9/0861 |

* cited by examiner

*Primary Examiner* — Talia F Crawley
(74) *Attorney, Agent, or Firm* — Yee & Associates, P.C.

(57) ABSTRACT

A method of increasing security and accessibility of data on a computer using a blockchain. A first smart contract is stored on the blockchain. The blockchain prevents alterations to the first smart contract. The first smart contract contains a redirection clause. The first smart contract contains a second clause to pay first wages to an employee upon receipt of a trigger event. A modification to the first smart contract is stored as a second smart contract on the blockchain prior to executing the instructions to pay the wages. The second smart contract contains a clause to pay second wages to the employee. The blockchain prevents any alterations to the second smart contract. Responsive to a trigger event, the first smart contract is executed, including executing the redirection clause prior to executing the second clause. Thereafter the second smart contract is executed and the second wages are directed be paid.

21 Claims, 10 Drawing Sheets

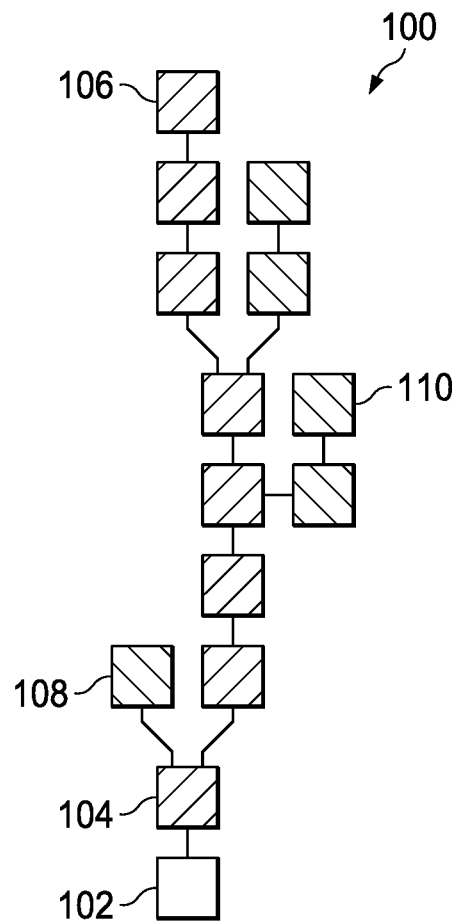
FIG. 1
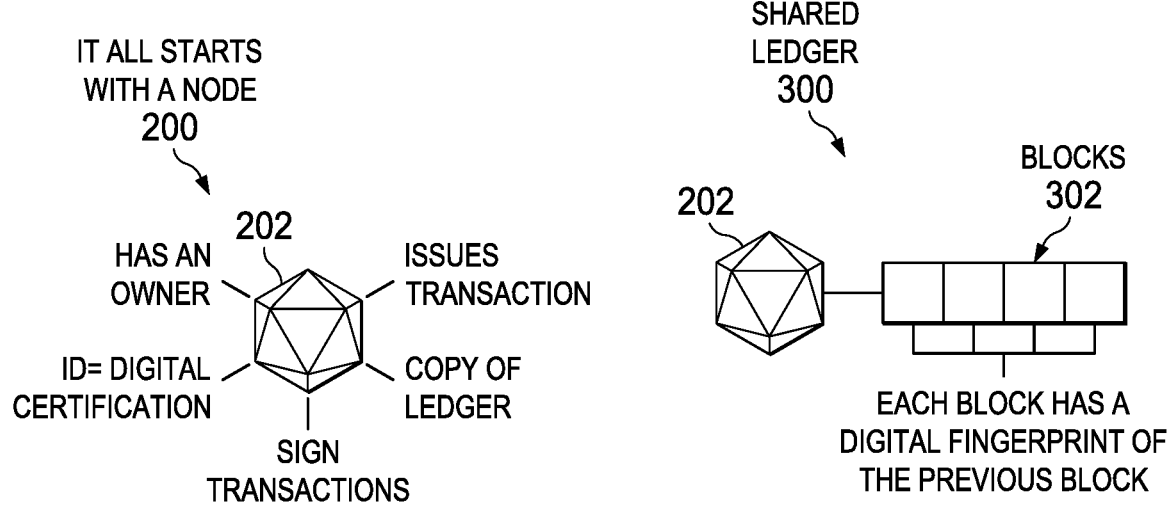
FIG. 2
FIG. 3

FORMING A
BLOCKCHAIN
NETWORK
400

TRANSACTIONS
AND DISTRIBUTION
500

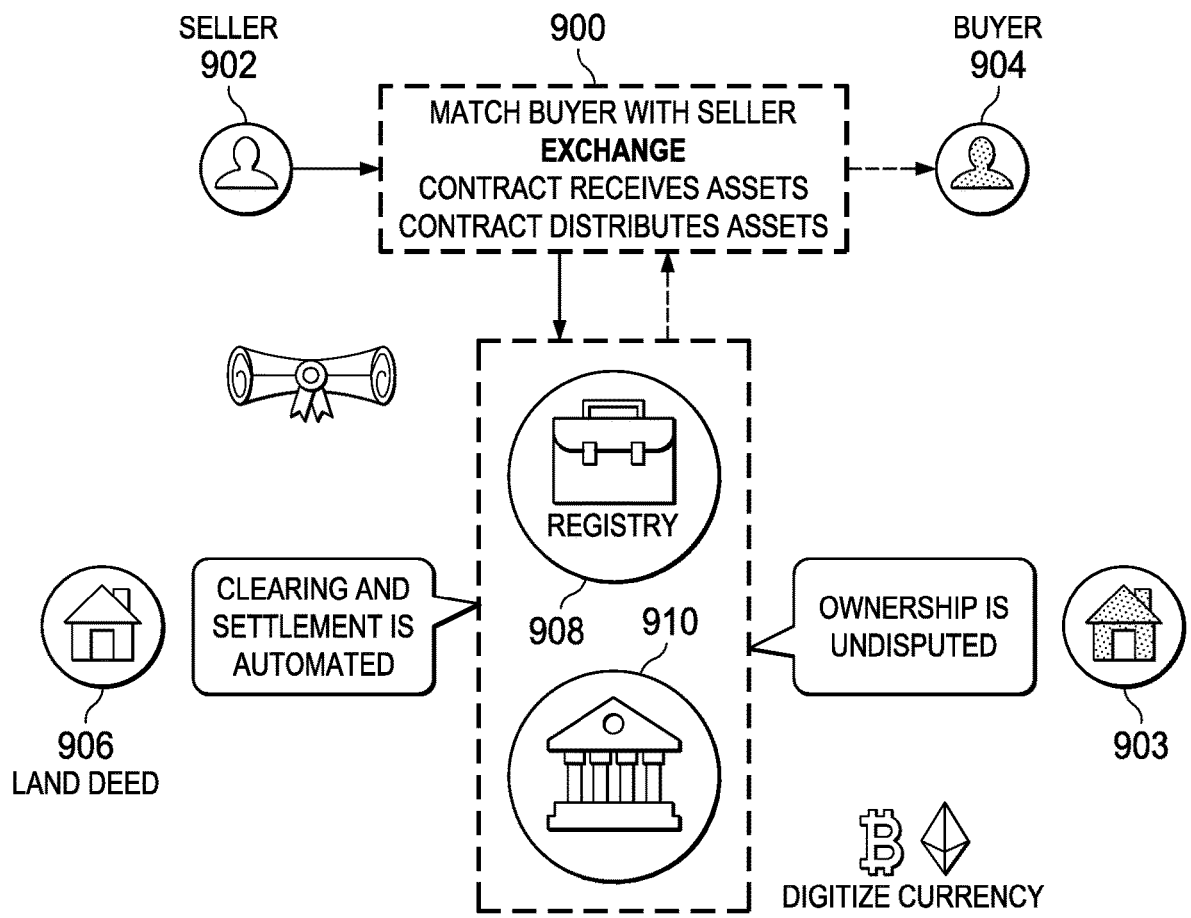

```
contract token {
        mapping (address => uint) public coinBalanceOf;
        event CoinTransfer (address sender, address receiver, uint amount);

/* Initializes contract with initial supply tokens to the creator of the contract */
        function token(uint supply) {
                if (supply == 0) supply = 10000;
                coinBalanceOf[msg.sender] = supply;
        }

/* Very simple trade function */
        function sendCoin (address receiver, uint amount) returns (bool sufficient) {
                if (coinBalanceOf[msg.sender] < amount) return false;
                coinBalanceOf[msg.sender] -= amount;
                coinBalanceOf[receiver] += amount;
                CoinTransfer (msg.sender, receiver, amount);
                return true;
        }
}
```

IMPLEMENTATION OF PAYROLL SMART CONTRACT ON A DISTRIBUTED LEDGER

CROSS-REFERENCE TO RELATED APPLICATION(S)

This application is related to U.S. patent application Ser. No. 15/588,606, filed May 6, 2017, titled "Payroll Based Blockchain Identity."

BACKGROUND INFORMATION

1. Field

The present disclosure relates to use of payroll smart contracts implemented solely in a computer network for use with distributed ledgers.

2. Background

A distributed ledger, as used throughout this document, refers to a computer-only technology that enables the distributed recordation of transactions through a distributed ledger maintained by a network of computers. A blockchain is an example of a distributed ledger. BITCOIN® is an example of a blockchain technology application.

A blockchain is a type of distributed ledger, which includes digitally recorded, unmodifiable data in packages called blocks. A distributed ledger is a consensus of replicated, shared, and synchronized digital data geographically spread across multiple computers which may be in different sites, countries, and/or institutions maintained by many different parties. A distributed ledger can be public, such as BITCOIN®, where there is no limitation on who may participate in the network, or private, where only approved parties are permitted to participate in the network.

SUMMARY

The illustrative embodiments provide for a method of increasing security and accessibility of data on a computer using a distributed ledger, consisting of a blockchain, and maintained solely on at least one non-transitory computer-recordable storage medium in a computer network. The method includes storing a first smart contract on the blockchain maintained in the computer network. The blockchain prevents any alterations to the first smart contract. The first smart contract contains a redirection clause in the event of authorized changes to the first smart contract. The first smart contract contains a second clause to pay first wages to an employee upon receipt of a trigger event. The method also includes, thereafter storing a modification to the first smart contract as a second smart contract on the blockchain prior to executing the instructions to pay the wages. The second smart contract contains a clause to pay second wages to the employee. The blockchain prevents any alterations to the second smart contract. The method also includes, thereafter receiving the trigger event. The method also includes, thereafter executing the first smart contract, including executing the redirection clause prior to executing the second clause. The method also includes, thereafter executing the second smart contract and directing that the second wages be paid, whereby computer security is increased by providing for payment of updated wages via the blockchain in which neither the first smart contract nor the second smart contract may be modified.

The illustrative embodiments also contemplate a computer configured to execute program code which implements this method. The illustrative embodiments also contemplate a non-transitory computer-recordable storage medium storing program code, which, when executed, implements this method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 is a block diagram of a distributed ledger in the form of a blockchain in accordance with an illustrative embodiment;

FIG. 2 is a block diagram illustrating a first step in creating a blockchain in accordance with an illustrative embodiment;

FIG. 3 is a block diagram illustrating a second step in creating a blockchain in accordance with an illustrative embodiment;

FIG. 9 is a block diagram illustrating operation of a smart contract in accordance with an illustrative embodiment;

DETAILED DESCRIPTION

The illustrative embodiments recognize and take into account that smart contracts on blockchains have not been used to process payroll. In other words, so far, no payroll company has attempted or designed a system that utilizes the underlying technology of blockchain and smart contracts to create an open and secure payroll system that is transparent among all participating parties. Thus, the illustrative embodiments provide for using smart contracts on the blockchain to process payroll, either with or without tax withholding and/or other types of withholding. The salary information and variables are encrypted in a payroll event call or may be stored at a secure off-chain location to be looked up at time of processing, and one or more third party smart contracts are being called by either a single payroll event call or by a payroll smart contract.

Figure 15:
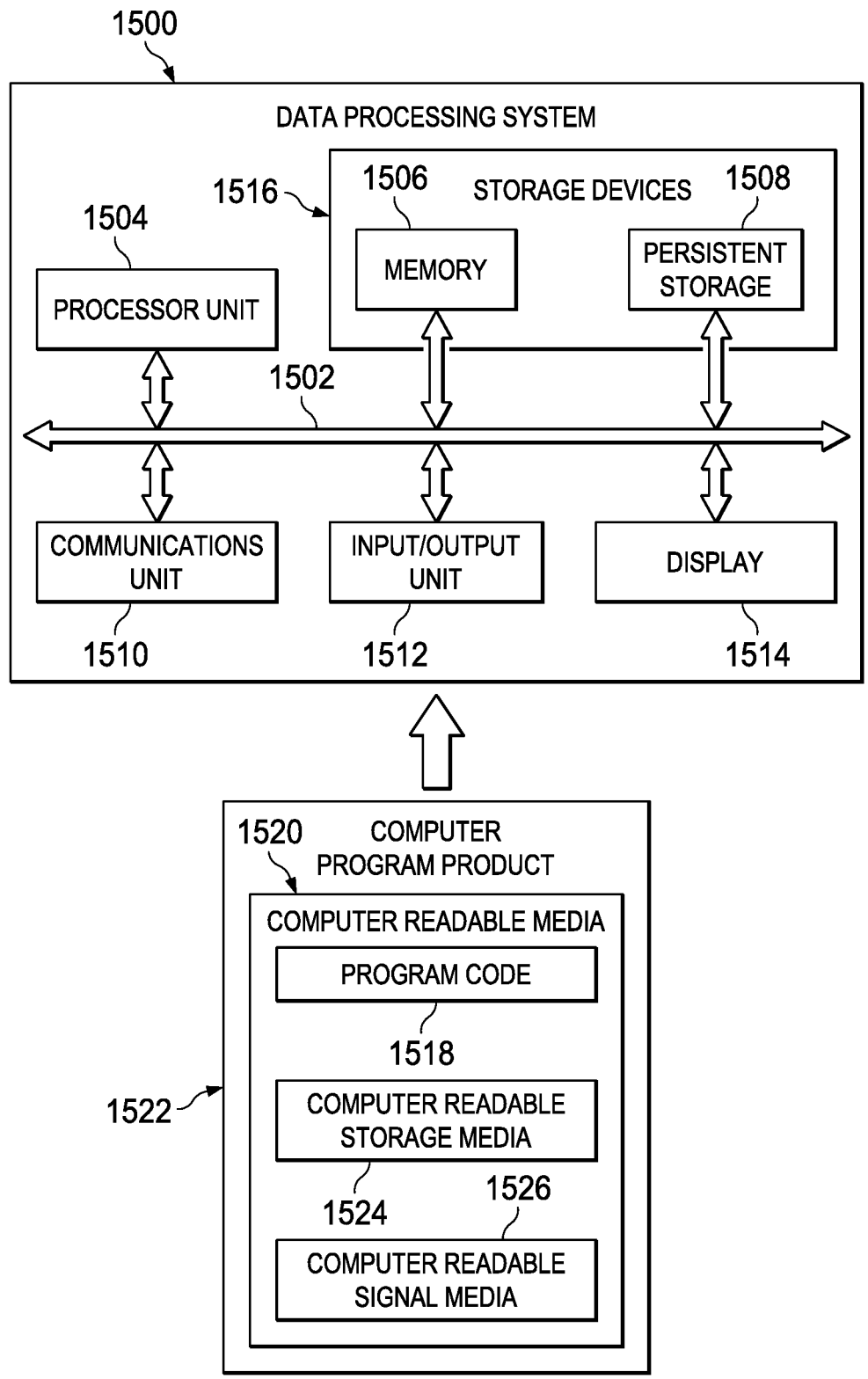
FIG. 15 is a block diagram of a data processing system in accordance with an illustrative embodiment.

Attention is first called to, in FIG. 1 through FIG. 8, distributed ledgers, including blockchains. Attention is then called to, in FIG. 9, the operation of smart contracts. Attention is then called to, in FIG. 10 through FIG. 13, the use of smart contracts in distributed ledgers for the purposes of maintaining payroll and possibly tax withholding, and other types of withholding. FIG. 15 describes a computer-useable medium with the illustrative embodiments.

FIG. 1 is a block diagram of a distributed ledger in the form of a blockchain depicted in accordance with an illustrative embodiment. Blockchain 100 is a blockchain, which is a specific implementation of a distributed ledger. Blockchain 100 is described to introduce blockchain concepts.

Blockchain 100 starts with genesis block 102. Blocks indicated with a right-leaning hash, such as block 104 or block 106, are part of the main chain. Blocks with a left leaning hash, such as block 108 or block 110, exist outside blockchain 100.

Stated more formally, a blockchain is a distributed database that maintains a continuously growing list of ordered records called "blocks". Each block contains a timestamp and a link to a previous block, with the hash of the prior block linking the two. By design, blockchains are inherently resistant to modification of the data because, once recorded, the data in a block cannot be altered retroactively. Through the use of a peer-to-peer network and a distributed time-stamping server, a blockchain database may be managed autonomously. Thus, blockchains may be used to provide an open, distributed ledger that can record transactions between parties efficiently, and in a verifiable and permanent way.

Distributed ledgers and blockchains, in particular, are secure by design. Blockchains have a high byzantine fault tolerance. Thus, a decentralized consensus can be achieved with a blockchain. The first blockchain was created by Satoshi Nakamoto in 2008 and implemented the following year as a core component of the digital currency BIT-COIN®, where it serves as the public ledger for all transactions. BITCOIN® was the first digital currency to solve the double spending problem, without the use of a trusted authority or central server.

Figure 4:
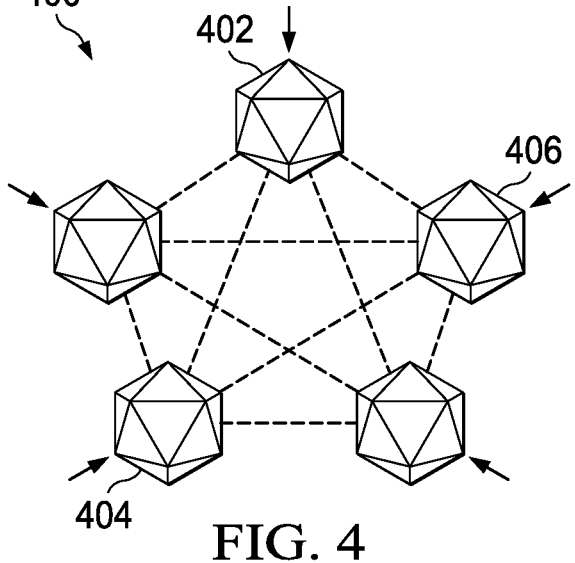
FIG. 4 is a block diagram illustrating a third step in creating a blockchain in accordance with an illustrative embodiment.
Figure 5:
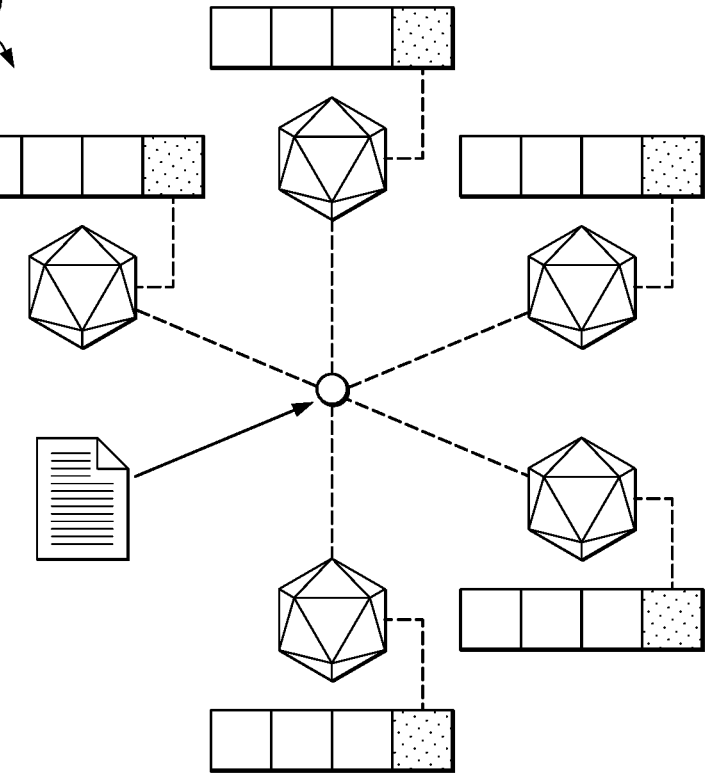
FIG. 5 is a block diagram illustrating a fourth step in creating a blockchain in accordance with an illustrative embodiment.
Figure 6:
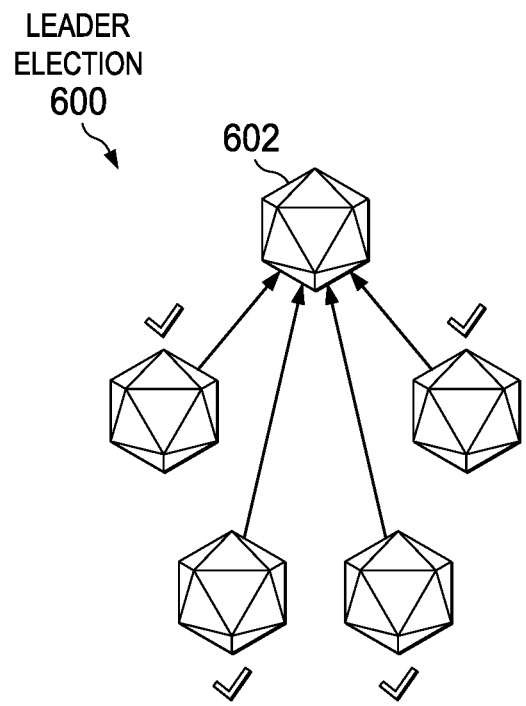
FIG. 6 is a block diagram illustrating a fifth step in creating a blockchain in accordance with an illustrative embodiment.
Figure 7:
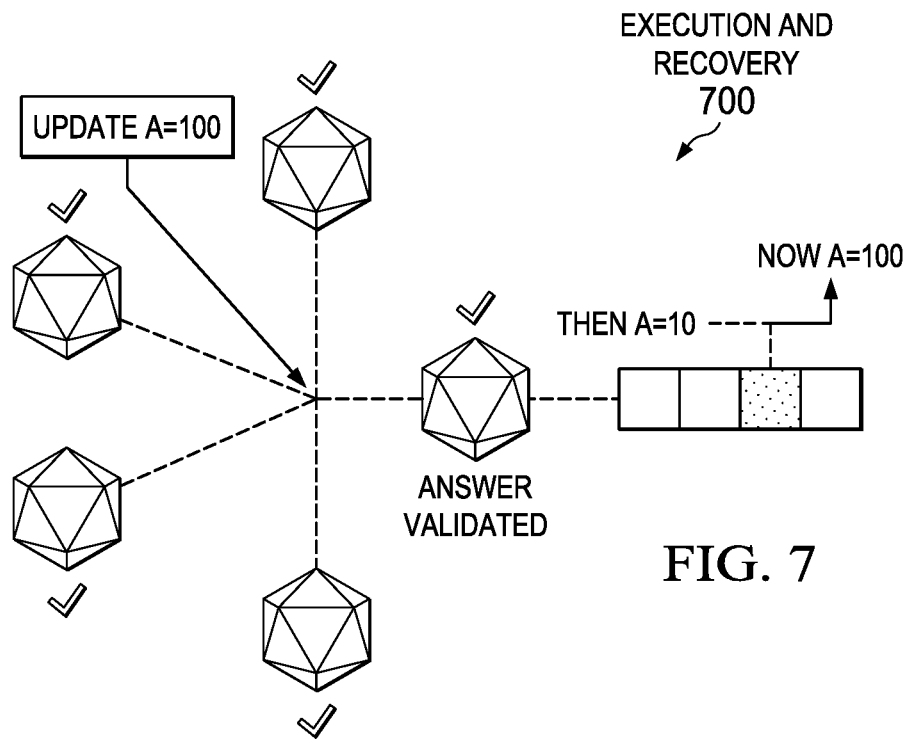
FIG. 7 is a block diagram illustrating a sixth step in creating a blockchain in accordance with an illustrative embodiment.

FIG. 2 through FIG. 7 should be considered together. FIG. 2 is a block diagram illustrating a first step in creating a blockchain depicted in accordance with an illustrative embodiment. FIG. 3 is a block diagram illustrating a second step in creating a blockchain depicted in accordance with an illustrative embodiment. FIG. 4 is a block diagram illustrating a third step in creating a blockchain depicted in accordance with an illustrative embodiment. FIG. 5 is a block diagram illustrating a fourth step in creating a blockchain depicted in accordance with an illustrative embodiment. FIG. 6 is a block diagram illustrating a fifth step in creating a blockchain depicted in accordance with an illustrative embodiment. FIG. 7 is a block diagram illustrating a sixth step in creating a blockchain depicted in accordance with an illustrative embodiment. FIG. 2 through FIG. 7 may be implemented on a computer or on multiple computers in a network environment. FIG. 2 through FIG. 7 addresses a technical problem that only exists in computer programming and execution. As used throughout FIG. 2 through FIG. 7, common reference numerals refer to common objects in these figures.

In operation 200, shown in FIG. 2, node 202 is created which contains the initial data for the distributed ledger. Node 202 includes an owner, a digital certificate identification, and a copy of a ledger. Node 202 may issue transactions.

In operation 300, shown in FIG. 3, blocks 302 are added to node 202. Each block in the shared ledger has a digital fingerprint of the previous block. In this manner, it is not possible to alter previous blocks without being detected.

In operation 400, shown in FIG. 4, blockchain network 402 is formed. Blockchain network 402 may include multiple blockchains, such as those shown in FIG. 2 or FIG. 3. Each blockchain has its own node, such as node 404 or node 406.

In operation 500, shown in FIG. 5, transactions and distributions are added to the various nodes. Thus, blocks are added to each node.

In operation 600, shown in FIG. 6, leader election takes place. In this operation, leader node 602 is elected. Leader node 602 takes priority for deciding which information is the most accurate or up to date.

In operation 700, shown in FIG. 7, data execution and recovery takes place. A query regarding data stored in one or more of the nodes may return a validated answer regarding the contents in the blocks.

Another description of blockchain technology is now presented. Blockchain technology enables the distributed recordation of transactions through a distributed ledger. As indicated above, BITCOIN® is an example of a blockchain technology application. A blockchain is a type of distributed ledger, comprised of digitally recorded, unmodifiable data in packages called "blocks". A distributed ledger is a consensus of replicated, shared, and synchronized digital data that is geographically spread across multiple sites, countries, and/or institutions.

These digitally recorded "blocks" of data are stored in a linear chain. Each block in the chain contains data (for example a BITCOIN® transaction) that is cryptographically hashed. The blocks of hashed data draw upon the previous block which came before it in the chain, ensuring all data in the overall blockchain has not been tampered with and remains unchanged.

Figure 8:
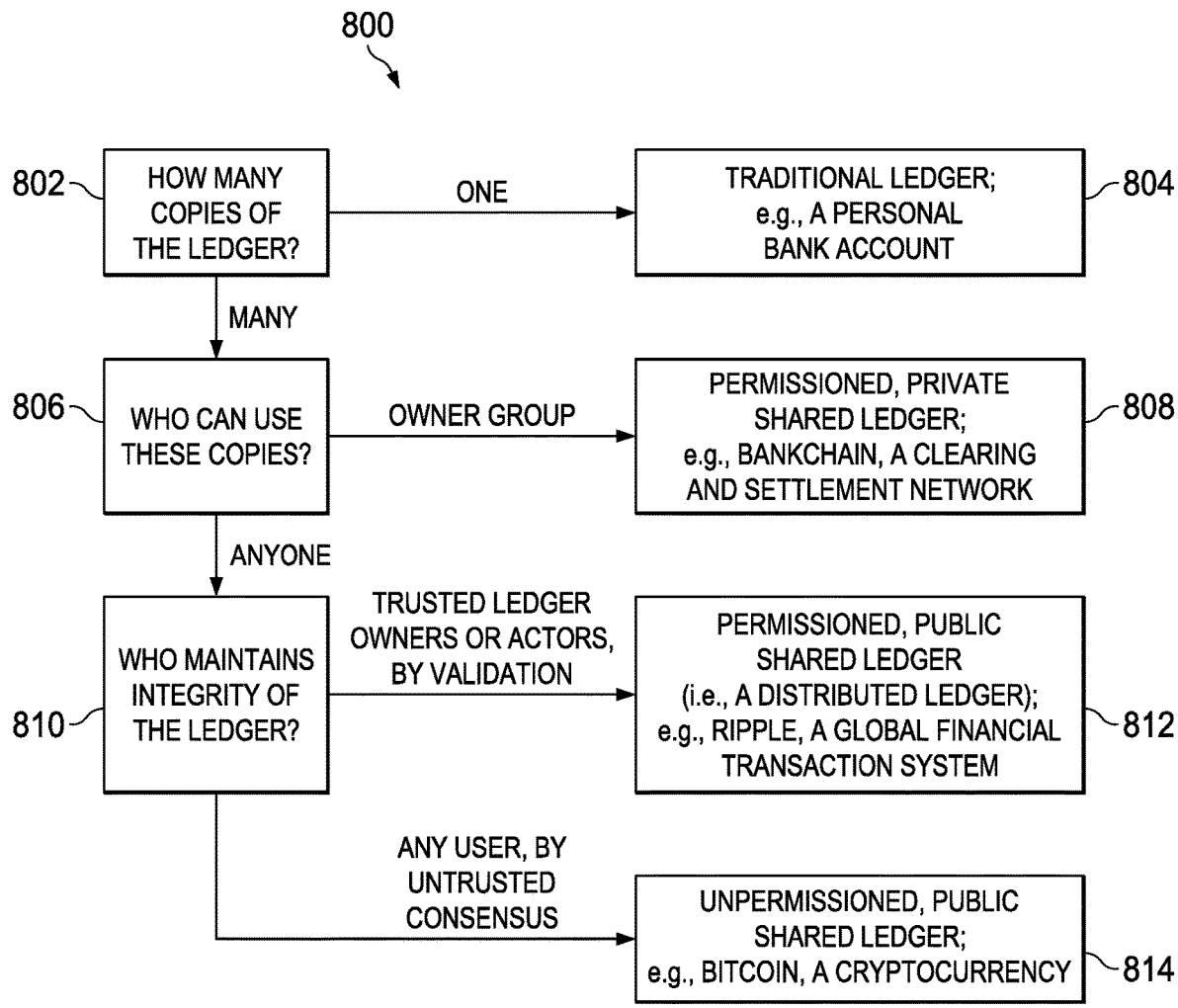
FIG. 8 is a block diagram illustrating different types of distributed ledgers, including blockchains, in accordance with an illustrative embodiment.

FIG. 8 is a block diagram illustrating different types of distributed ledgers, including blockchains, depicted in accordance with an illustrative embodiment. Block diagram 800 of FIG. 8 is not a flowchart, but rather a way of looking at distributed leger technology types. The distributed ledger technology types described with respect to FIG. 8 may be used with respect to the illustrative embodiments described herein, but only with respect to computer technologies. The illustrative embodiments do not function using writing implements or mental thought, because a technical solution to a computer problem is addressed by the illustrative embodiments. Namely, using distributed ledger technology in a secured, multi-level security environment for electronic payroll services.

In considering distributed ledger technology, one question to ask is how many copies are there of the ledger (block 802). If only one copy of the ledger is present, the ledger is likely a traditional ledger (block 804), such as a personal bank account. However, if many ledgers are present, then another question is asked as to who can use the copies of the ledgers (block 806).

If an owner group can use the copies of the ledgers, then a permissioned, private shared ledger is present (block 808). Examples of these ledgers may be a bankchain, a clearing and settlement network, and other examples of ledgers. However, if anyone can use the ledger, then another question is asked as to who maintains the integrity of the ledger (block 810).

If only trusted ledger owners or actors can maintain the integrity of the ledger, usually by some kind of validation process, then a permissioned, public shared ledger is being used (block 812). This type of ledger is a distributed ledger. Examples of this type of ledger are RIPPLE®, or a global financial transaction system.

However, if any user, by an untrusted consensus, can maintain the integrity of the ledger, then an un-permissioned, public shared ledger is being used (block 814). An example of this kind of distributed ledger is BITCOIN®, which is a blockchain cryptocurrency.

A blockchain is just one type of distributed ledger. Not all distributed ledgers necessarily employ blocks or chain transactions. Although the term "blockchain" is used more frequently than "distributed ledger" in discussions, a blockchain is only one of the many types of data structures that provide secure and valid achievement of a distributed consensus. The BITCOIN® blockchain, which uses "proof-of-work mining", is the most publicly proven method used to achieve a distributed consensus. However, other forms of distributed ledger consensus exist, such as ETHEREUM®, RIPPLE®, HYPERLEDGER®, MULTICHAIN®, ERIS®, and other private enterprise solutions. Users of distributed ledger technology (DLT) may significantly benefit from the efficiencies and economics by creating a more robust environment for real-time and secure data sharing.

FIG. 9 is a block diagram illustrating operation of a smart contract depicted in accordance with an illustrative embodiment. Smart contract 900 is only an example of one type of smart contract in the context of buying and selling homes. However, the illustrative embodiments contemplate using smart contracts, like smart contract 900, for payroll and withholding services. Nevertheless, smart contract 900 is described for illustration purposes.

Seller 902 desires to sell house 903. Buyer 904 desires to buy a house. Seller 902 and buyer 904 do not know each other, but wish to purchase the house in an automated way (buyer 904, for example, may wish to flip houses generally). Smart contract 900 provides a secure and automatic mechanism for implementing this transaction.

For example, smart contract 900 may digitize land deed 906. Smart contract 900 provides for automated clearing and settlement, including providing for registry of the sale of the house, as indicated at registry 908, and legal guarantees of sale, as indicated by courthouse 910.

Smart contract 900 implements this exchange in an automated way. Thus, for example, buyer 904 might indicate an agreement to buy house 903, and acts as a trigger to automatically exchange money and transfer the title. The process is fast and secure.

Attention is now turned to some of the technical details regarding implementation of a smart contract. In the context of blockchains and distributed ledgers, smart contracts are pre-written logic (computer code), stored and replicated on a distributed ledger (such as a blockchain), and executed by a network of computers (usually the same ones running the blockchain). Smart contracts result in actions being taken by affected parties (the money transfer, titles, information exchanges, etc.). In other words, smart contracts are computer programs that execute contingent instructions. Smart contracts are run and verified by many computers to ensure trustworthiness. Whereas blockchains provide distributed trustworthy storage, smart contracts provide distributed trustworthy calculations.

In a different example, code 912 is provided for implementing a basic smart contract that is written for use on the ETHEREUM® blockchain. Code 912 is a smart contract that generates ten thousand tokens to the creator of the contract, and then allows anyone with enough of a balance to send it to others. These tokens are the minimum tradable unit and cannot be subdivided, but for the final users could be presented as 100 units subdividable by 100 subunits. Thus, owning a single token would represent having 0.01% of the total.

In a still different example, an option contract between parties may be written as program code into a blockchain. The individuals involved are anonymous, but the contract is the public ledger. A triggering event, like an expiration data and strike price, is hit and the contract executes itself according to the coded terms. Regulars can use the blockchain to understand the activity in the market while maintaining the privacy of the individual actors' positions.

Smart contracts have a number of desirable properties. For example, smart contracts provide autonomy. Brokers are not needed for implementation of smart contracts, nor are lawyers or other intermediaries needed to confirm that the terms of the contract have been met. Likewise, third parties cannot interfere with or manipulate the transaction. The reason is that execution is managed automatically by the network, rather than by one or more, possibly biased, individuals who may err.

Another desirable property of smart contracts is trust. Documents are encrypted on a shared ledger. Thus, many computers ensure that the data is true and correct.

Another desirable property of smart contracts is redundancy. On a distributed ledger, documents are duplicated many times over on the computers managing the distributed ledger.

Another desirable property of smart contracts is safety. Because smart contracts on distributed ledgers cannot be modified, they are highly resistant to hacking.

Another desirable property of smart contracts is speed. Smart contracts automate tasks normally performed manually, thereby saving time, possibly many hours.

Another desirable property of smart contracts is savings. Smart contracts save money since they eliminate, or at least reduce, the need for intermediaries.

Another desirable property of smart contracts is accuracy. Smart contracts are not only faster and cheaper, but also avoid the errors that come from manually filling out forms.

Figure 10:
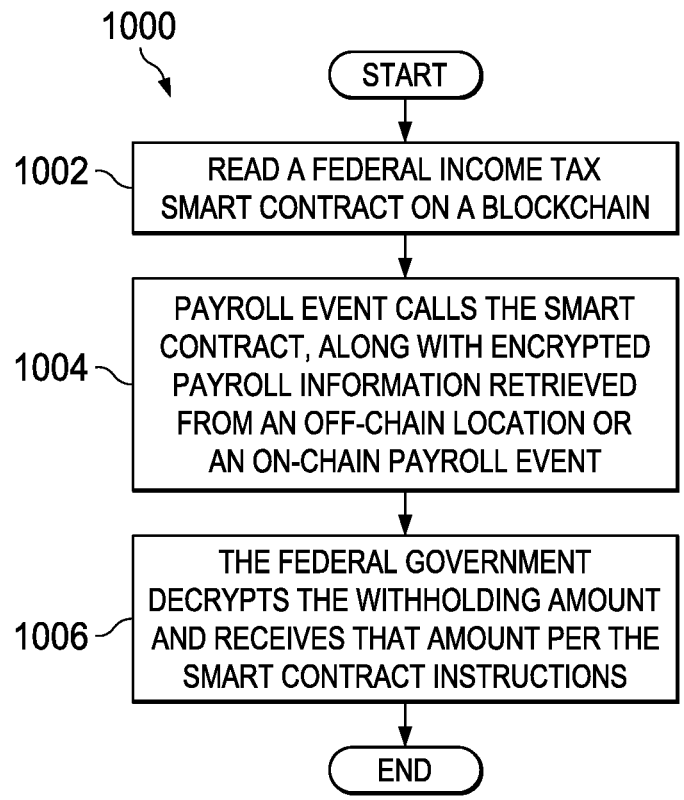
FIG. 10 is a flowchart of a method of using a smart contract with a blockchain for payroll and wage withholding in accordance with an illustrative embodiment.

FIG. 10 is a flowchart of a method of using a smart contract with a blockchain for payroll and wage withholding depicted in accordance with an illustrative embodiment. FIG. 10 may also be characterized as a process of a payroll agent paying for withheld federal income tax. Method 1000 may be implemented by a computer, such as data processing system 1500 of FIG. 15. Method 1000 is specific to a tax withholding example, but the illustrative embodiments are not necessarily limited by this example. Method 1000 may also be implemented on some other type of distributed ledger.

Method 1000 may begin with reading a federal income tax smart contract on a blockchain (operation 1002). A payroll event calls the smart contract, along with encrypted payroll information retrieved from an off-chain location or an on-chain payroll event (operation 1004). The Federal Government then decrypts the withholding amount and receives that amount per the smart contract instructions (operation 1006). In one illustrative embodiment, the method may terminate thereafter.

Stated differently, there is a federal income tax smart contract on a blockchain. A payroll event calls the smart contract, along with encrypted payroll information (retrieved from off-chain location or on chain payroll event). The Federal Government decrypts the amount and receives the correct amount per the smart contract instructions.

Attention is now turned to broader issues of managing payroll using blockchains and smart contracts. Multiple parties are affected by a payroll event. For example, in a payroll transaction in the United States Government, the Federal Government withholds federal income taxes, social security taxes, Medicare or other taxes. A state government may withhold state income taxes, and state unemployment and disability taxes. Besides statutory withholdings, there are non-statutory withholdings such as retirement savings, like a 401K account or an individual retirement account (IRA), health benefits, health insurance, life insurance, corporate stock purchases, etc.

Traditionally, payroll companies program logic within a payroll engine, using embedded data within the program logic or metadata external to the program to look up tax rates or other statics. When a payment to a third party, such as the Federal Government or the insurance company, is made, the third party uses its own database to keep track of payments received. Each third party has a copy of their own proprietary database, giving rise to potential errors at multiple places. If the payroll engine makes an error, upon reporting from the third party about the error, an engineer at the payroll company may need to go through the internal logic of the payroll engine to fix the error.

The advent of the blockchain technology and smart contracts allows for a technological improvement that will make the payroll system more transparent across parties. With the same copy of transaction records replicated among all participating parties, when combining with modern encryption technology, the payroll system can continue to have its legacy of privacy while becoming more transparent among the participating parties.

Using the federal income tax as an example, the Federal Government can publish one or more smart contracts on how income taxes should be withheld. For example, pseudo code for the federal income tax contract in one of its simplest forms can look as follows:

```
        contract incomeTaxBracketAA {address__from,
address__info
    ...
    /*calculate the amount */
    /*encrypted__amount is looked up at the adderss__info
*/
        withhold__amount = encrypted__amount*BracketRateAA
        /*transfer the amount */
        transfer (withhold__amount, account__to,
account__from)
```

-continued

```
/*send a confirmation message to write on the blockchain */
write__confirmation (message__w__encrypted__withhold__amount,
address__from)
    }
```

Many variations are possible. For example, rather than using more than one smart contract, the Federal Government can rely on one master smart contract to redirect individual transactions to different sub-smart contracts upon analysis of data.

Similarly, an insurance company or a retirement plan provider can rely on a public smart contract to be called upon at a payroll event. When the tax rate or insurance rate changes, the smart contract can look up the changes dynamically from an internet address or other secure off-blockchain location. In this manner, the payroll agent managing the distribution and withholding of wages does not need to make any changes to the smart contract.

Thus, either the third party or the payroll company can provide the public smart contracts. Never before has a payroll transaction called one or more public smart contracts with encrypted data stored on-chain or off-chain to ensure transparency among all participating parties.

A payroll event can also be written as a smart contract. For example, for a salaried employee who gets paid every two weeks, a smart contract can be written to trigger a payroll event on such regular intervals without additional work. Variables such as salary, number of exemptions, retirement plan amounts, and other withholdings can be stored off-chain with only an internet address at which the data is encrypted.

Figure 11:
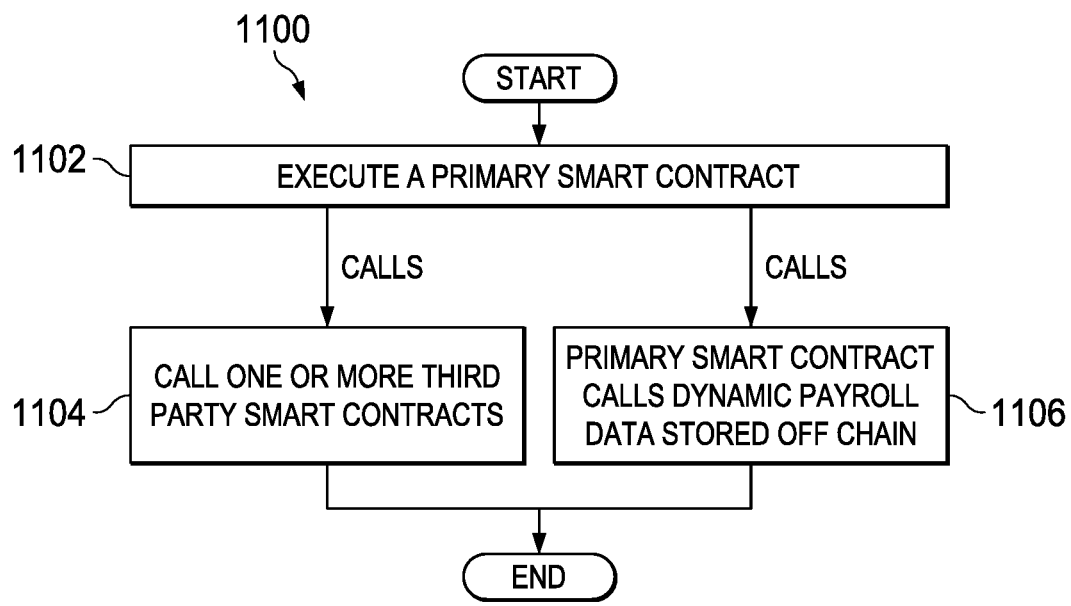
FIG. 11 is a flowchart of a method of using a smart contract with a blockchain along with additional smart contracts in accordance with an illustrative embodiment.

FIG. 11 is a flowchart of a method of using a smart contract with a blockchain along with additional smart contracts depicted in accordance with an illustrative embodiment. FIG. 11 may also be characterized as a process of nesting smart contracts. Method 1100 may be implemented by a computer, such as data processing system 1500 of FIG. 15. Method 1100 is specific to an example of an implementation of payroll smart contracts, but the illustrative embodiments are not necessarily limited by this example. Method 1100 may also be implemented using one or more blockchains, or some other type of distributed ledger.

Method 1100 may begin by executing a primary smart contract (operation 1102). The primary smart contract then calls one or more third party smart contracts (operation 1104). Optionally, and possibly simultaneously, the primary smart contract calls dynamic payroll data stored off-chain (operation 1106). In one illustrative embodiment, the method may terminate thereafter.

A payroll transaction can call one or more public smart contracts to transact with one or more third parties to complete a payroll event on a distributed ledger. The distributed ledger may be in the form of a blockchain and may be public or private to only the participating parties. The participating parties contribute to the computing power of maintaining the distributed ledger by acting as miners.

Data can be stored off the blockchain in the encrypted form to be looked up at time of processing or in encrypted form on the blockchain. When data is stored off-chain, the payroll smart contract can call off-chain data and third party payment smart contracts to process payroll. Payroll may involve payment of digital currency, the transaction of which can be recorded on the blockchain.

At some point, the off-chain storage of payroll information can use a standardized format. For example, when there are standardized identifiers for a hashed social security number, an encrypted salary, an exemption, or a percentage to be transferred to a retirement account, etc., all a payroll agent has to do is to provide and update the information in the standardized format while the smart contracts on the blockchain do the rest.

Figure 12:
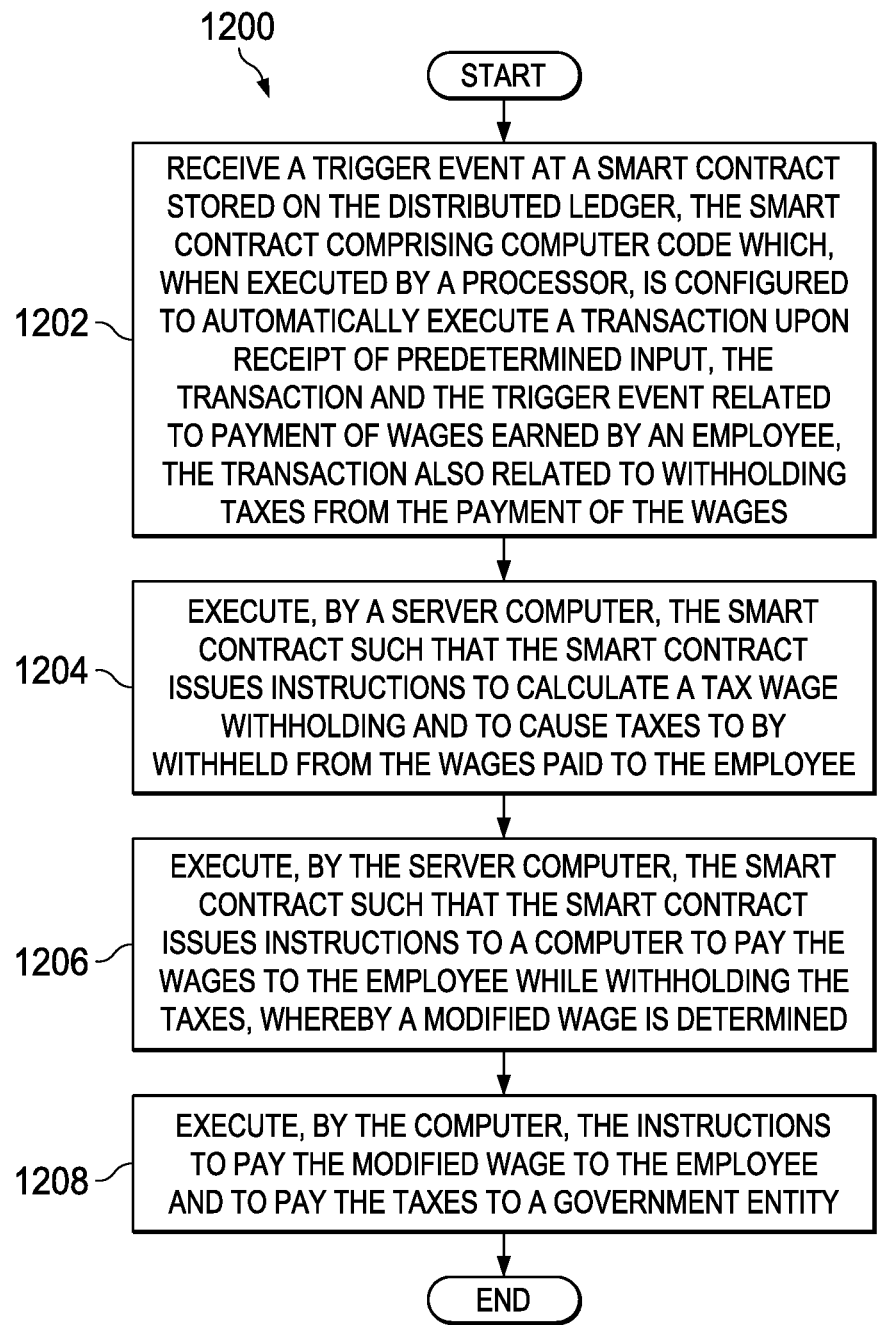
FIG. 12 is a flowchart of a computer-implemented method of using a distributed ledger maintained solely on at least one non-transitory computer-recordable storage medium in a computer network in accordance with an illustrative embodiment.

FIG. 12 is a flowchart of a computer-implemented method of using a distributed ledger maintained solely on at least one non-transitory computer-recordable storage medium in a computer network depicted in accordance with an illustrative embodiment. FIG. 12 may be implemented on a computer or on multiple computers in a network environment. FIG. 12 addresses a technical problem that only exists in computers, particularly a network-centric system of computers. FIG. 12 is an example of a use for a distributed ledger, including possibly a blockchain, described with respect to FIG. 1 through FIG. 8. FIG. 12 is a variation of the illustrative embodiments described with respect to FIG. 9 through FIG. 11. Method 1200 may be implemented using a data processing system, such as data processing system 1500 of FIG. 15.

Method 1200 may be characterized as a method of using a distributed ledger maintained solely on at least one non-transitory computer-recordable storage medium in a computer network. Method 1200 may include receiving a trigger event at a smart contract stored on the distributed ledger, the smart contract comprising computer code which, when executed by a processor, is configured to automatically execute a transaction upon receipt of a predetermined input, the transaction and the trigger event related to payment of wages earned by an employee, the transaction also related to withholding taxes from the payment of the wages (operation 1202).

Method 1200 may also include executing, by a server computer, the smart contract such that the smart contract issues instructions to calculate a tax wage withholding and to cause taxes to be withheld from the wages paid to the employee (operation 1204). Method 1200 may also include executing, by the server computer, the smart contract such that the smart contract issues instructions to a computer to pay the wages to the employee while withholding the taxes, whereby a modified wage is determined (operation 1206).

Method 1200 may also include executing, by the computer, the instructions to pay the modified wage to the employee and to pay the taxes to a government entity (operation 1208). In one illustrative embodiment, the method may terminate thereafter.

Method 1200 may be varied. More or fewer operations may be present. For example, prior to receiving the trigger event, method 1200 may include calling a sub-level smart contract from a third party. In this case, the third party may be the government entity. This illustrative embodiment may work like a subroutine within a master routine. The first and second smart contracts may be the master routine, and the master routine may call additional multiple subroutines.

In another example, method 1200 may include modifying the smart contract prior to executing the instructions to pay the wages, and modifying payment of the wages according to the modification. In this case, method 1200 may also include receiving a modification to the smart contract from a third party prior to modifying the smart contract. Yet further in this example, method 1200 may also include calculating an additional withholding based on the modification, withholding the additional withholding from the wages, and paying the additional withholding to an entity specified in the modification to the smart contract. Still further in this example, the modification may be as a result of a court order to withhold a portion of the wages. For example, the modification further may include instructions coded to pay the withholding to an account associated with an entity specified in the court order. The court order may be for one of child support, a chapter 13 bankruptcy payment, and a payment on a judgement, and wherein the instructions are coded to pay the additional withholding to a recipient of the child support, the chapter 13 bankruptcy payment, and the payment on the judgement.

In a different illustrative embodiment, the withholding may be as a result of a request by at least one of an employer and the employee to withhold the additional portion of the wages. In this case, the modification may be instructions coded to pay the additional withholding to an insurance company to pay an insurance premium for the employee. The modification may be instructions coded to pay the additional withholding to a retirement account for the employee.

In yet another illustrative embodiment, the non-transitory computer-recordable storage medium may be located remotely from the server computer. The server computer and the computer are a single computer. The server computer and the computer may be different computers belonging to different entities.

In still another illustrative embodiment, the distributed ledger may be a blockchain. In this case, method 1200 may also include storing off-chain, wage payment information related to payment of the wages and the taxes, wherein off-chain data is created. Furthering this example, method 1200 may also include, after storing the wage payment information, calling, by the smart contract, the off-chain data and processing an additional transaction using the off-chain data.

In still another different illustrative embodiment, the distributed ledger may be a blockchain. In this case, method 1200 may also include storing on-chain, wage payment information related to payment of the wages and tax payment information related to payment of the taxes.

The illustrative embodiments described with respect to FIG. 12 may be further varied. For example, all of the illustrative embodiments described with respect to FIG. 12 may also be implemented as a computer, including a processor and a non-transitory computer-recordable storage medium storing computer code which, when executed by the processor, performs the computer-implemented method. Likewise, all of the illustrative embodiments described with respect to FIG. 12 may be implemented as the non-transitory computer-recordable storage medium itself. Yet further illustrative embodiments are possible, such as more or fewer operations being present. Thus, the claimed inventions are not necessarily limited by the examples described with respect to FIG. 12.

Figure 13:
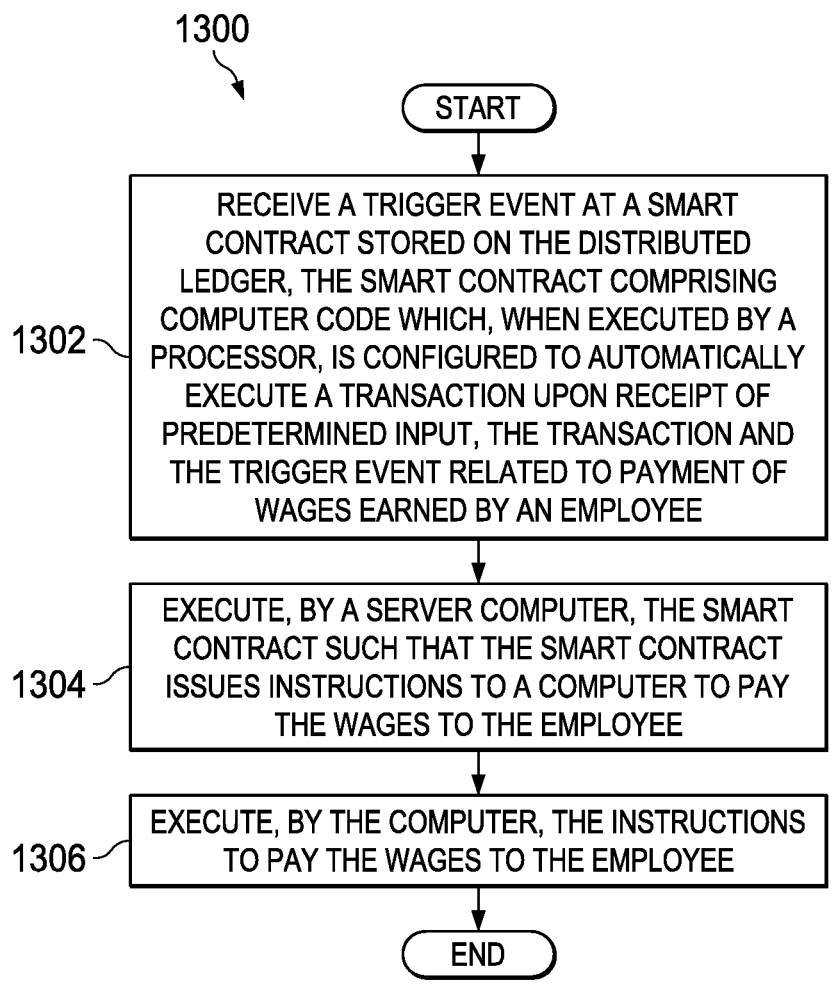
FIG. 13 is a flowchart of a computer-implemented method of using a distributed ledger maintained solely on at least one non-transitory computer-recordable storage medium in a computer network in accordance with an illustrative embodiment.

FIG. 13 is a flowchart of a computer-implemented method of using a distributed ledger maintained solely on at least one non-transitory computer-recordable storage medium in a computer network depicted in accordance with an illustrative embodiment. FIG. 13 may be implemented on a computer or on multiple computers in a network environment. FIG. 13 addresses a technical problem that only exists in computers, particularly a network-centric system of computers. FIG. 13 is an example of a use for a distributed ledger, including possibly a blockchain, described with respect to FIG. 1 through FIG. 8. FIG. 13 is a variation of the illustrative embodiments described with respect to FIG. 9 through FIG. 12. Method 1300 may be implemented using a data processing system, such as data processing system 1500 of FIG. 15.

Method 1300 may be characterized as a computer-implemented method of using a distributed ledger maintained solely on at least one non-transitory computer-recordable storage medium in a computer network. Method 1300 may include receiving a trigger event at a smart contract stored on the distributed ledger, the smart contract comprising computer code which, when executed by a processor, is configured to automatically execute a transaction upon receipt of a predetermined input, the transaction and the trigger event related to payment of wages earned by an employee (operation 1302). Method 1300 may also include executing, by a server computer, the smart contract such that the smart contract issues instructions to a computer to pay the wages to the employee (operation 1304). Method 1300 may also include executing, by the computer, the instructions to pay the wages to the employee (operation 1306). In one illustrative embodiment, the method may terminate thereafter.

Method 1300 may be varied. For example, method 1300 may also include receiving, at the server computer, the smart contract from a third party different than an entity that operates the server. The third party may be a government entity. The smart contract may further include code which, when executed by the processor, implements a computer-implemented algorithm for tax wage withholding and causes taxes to be withheld from the wages paid to the employee.

Method 1300 may be further varied. For example, method 1300 may also include modifying the smart contract prior to executing the instructions to pay the wages, and modifying payment of the wages according to the modification. In this case, method 1300 may also include receiving a modification to the smart contract from a third party prior to modifying the smart contract. The modification may be instructions coded to withhold a portion of the wages, whereby a withholding is formed. The withholding is a result of a court order to withhold a portion of the wages. The modification further may include instructions coded to pay the withholding to an account associated with an entity specified in the court order. The court order may be for one of child support, a chapter 13 bankruptcy payment, and a payment on a judgement. The instructions may be coded to pay the withholding to a recipient of the child support, the chapter 13 bankruptcy payment, and the payment on the judgement.

In another illustrative embodiment, the modification further may include instructions coded to withhold a portion of the wages, whereby a withholding is formed. The withholding is a result of a request by at least one of an employer and the employee to withhold a portion of the wages. In this case, the modification may include instructions coded to pay the withholding to an insurance company to pay an insurance premium for the employee. The modification may include instructions coded to pay the withholding to a retirement account for the employee.

In still another illustrative embodiment, the non-transitory computer-recordable storage medium may be located remotely from the server computer. The server computer and the computer are a single computer. The server computer and the computer may be different computers belonging to different entities.

In yet another illustrative embodiment, the distributed ledger may be a blockchain. In this case, method 1300 may also include storing off-chain, wage payment information related to payment of the wages, wherein off-chain data is created. Furthermore, method 1300 may also include, after storing the wage payment information, calling, by the smart contract, the off-chain data and processing an additional transaction and using the off-chain data.

In still another illustrative embodiment, the distributed ledger may be a blockchain. In this case, method 1300 may also include storing on-chain, wage payment information related to payment of the wages.

The illustrative embodiments described with respect to FIG. 13 may be further varied. For example, all of the illustrative embodiments described with respect to FIG. 13 may also be implemented as a computer including a processor and a non-transitory computer-recordable storage medium storing computer code which, when executed by the processor, performs the computer-implemented method. Likewise, all of the illustrative embodiments described with respect to FIG. 13 may be implemented as the non-transitory computer-recordable storage medium itself. Yet further illustrative embodiments are possible, such as more or fewer operations being present. Thus, the claimed inventions are not necessarily limited by the examples described with respect to FIG. 13.

Figure 14:
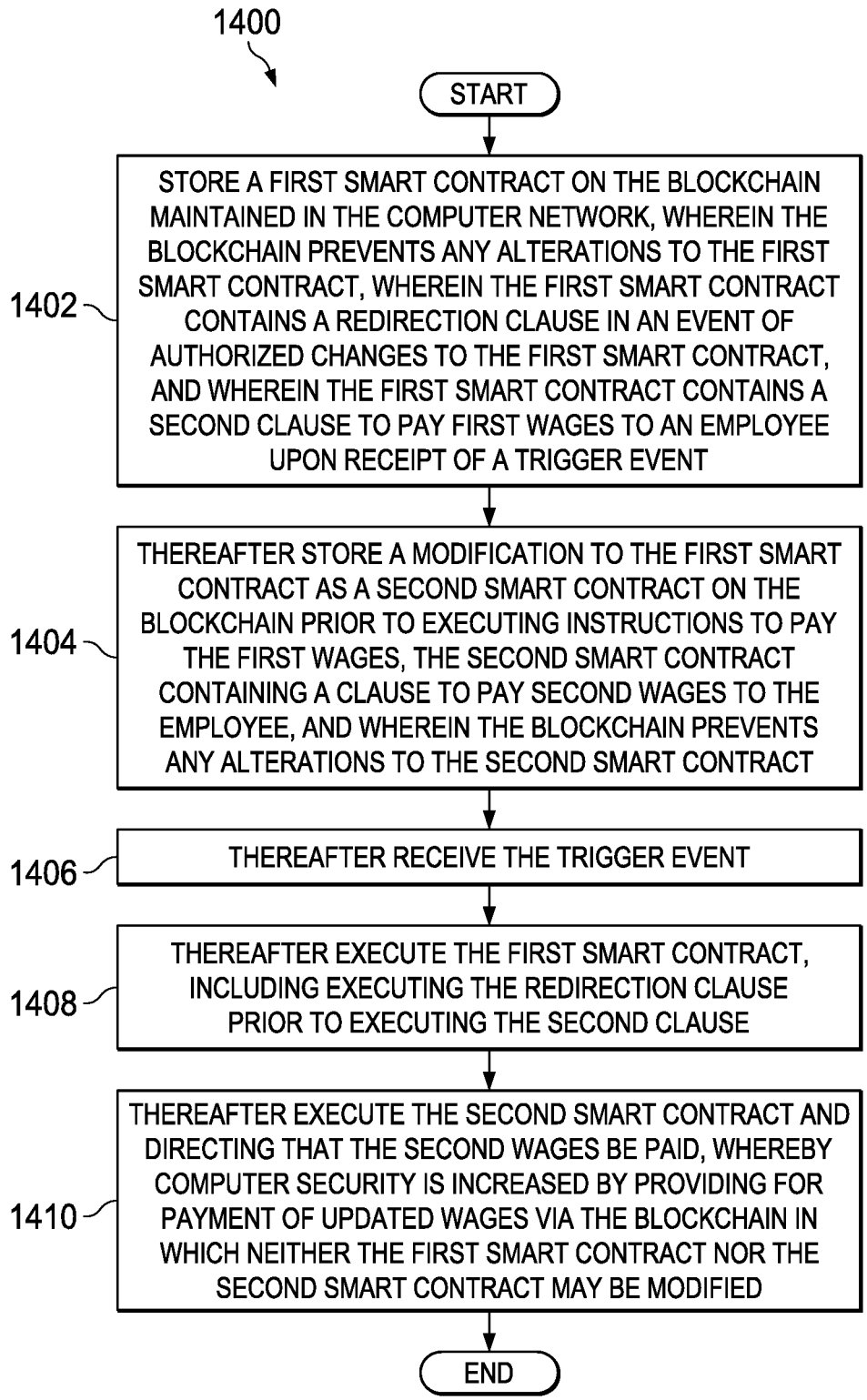
FIG. 14 is a flowchart of a computer-implemented method of using a distributed ledger maintained solely on at least one non-transitory computer-recordable storage medium in a computer network in accordance with an illustrative embodiment.

FIG. 14 is a flowchart of a computer-implemented method of using a distributed ledger maintained solely on at least one non-transitory computer-recordable storage medium in a computer network depicted in accordance with an illustrative embodiment. FIG. 14 may be implemented on a computer or on multiple computers in a network environment. FIG. 14 addresses a technical problem that only exists in computers, particularly a network-centric system of computers. Specifically, method 1400 increases the security of the payment of wages while improving accessibility to authorized users. FIG. 14 is an example of a use for a distributed ledger, including possibly a blockchain, described with respect to FIG. 1 through FIG. 8. FIG. 14 is a variation of the illustrative embodiments described with respect to FIG. 9 through FIG. 13. Method 1400 may be implemented using a data processing system, such as data processing system 1500 of FIG. 15.

Method 1400 may be characterized as a method of increasing security and accessibility of data on a computer using a distributed ledger, consisting of a blockchain, and maintained solely on at least one non-transitory computer-recordable storage medium in a computer network. Method 1400 includes storing a first smart contract on the blockchain maintained in the computer network, wherein the blockchain prevents any alterations to the first smart contract, wherein the first smart contract contains a redirection clause in the event of authorized changes to the first smart contract, and wherein the first smart contract contains a second clause to pay first wages to an employee upon receipt of a trigger event (operation 1402). Method 1400 also includes thereafter storing a modification to the first smart contract as a second smart contract on the blockchain prior to executing the instructions to pay the wages, the second smart contract containing a clause to pay second wages to the employee, and wherein the blockchain prevents any alterations to the second smart contract (operation 1404).

Method 1400 also includes thereafter receiving the trigger event (operation 1406). Method 1400 also includes thereafter executing the first smart contract, including executing the redirection clause prior to executing the second clause (operation 1408). Method 1400 also includes thereafter executing the second smart contract and directing that the second wages be paid, whereby computer security is increased by providing for payment of updated wages via the blockchain in which neither the first smart contract nor the second smart contract may be modified (operation 1410). In one illustrative embodiment, the method may terminate thereafter.

Method 1400 may be varied. For example, method 1400 also may include, prior to storing the first smart contract on the blockchain, assigning a unique identifier to the employee, and storing the unique identifier on the blockchain. In another illustrative embodiment, the unique identifier comprises a hash of combination of two or more of a social security number of the employee, a name of the employee, a birth date of the employee, a code provided by a third party vendor, and a code provided by the employee. In still another illustrative embodiment, both the first smart contract and the second smart contract includes a function at the beginning of corresponding instructions in the first smart contract and the second smart contract to check for an updated version stored later on the blockchain.

Method 1400 also may include receiving the second smart contract from a third party. In this case, the third party may be a government agency, and the second smart contract further includes instructions to withhold taxes payable to the government agency from the wages. In a different example, the third party comprises a court, and the second smart contract further includes instructions to withhold a court-ordered payment payable to an entity from the wages. The court order may be for one of child support, a chapter 13 bankruptcy payment, and a payment on a judgement. In still another different example, the third party may be an insurance company or some other entity to which the employee voluntarily provides wage withholding.

In still another illustrative embodiment, the first smart contract and the second smart contract both contain expiration clauses that prevent the first contract and the second contract from being repeatedly executed from the blockchain. In this case, the blockchain prevents alteration of the first contract and the second contract. Thus, security for the expiration clauses is ensured.

Method 1400 also may include, prior to storing the first smart contract on the blockchain, assigning a first unique identifier to the employee; storing the first unique identifier on the blockchain; assigning and storing a second unique identifier to the employee based on a third smart contract from a third party unrelated to a party paying the wages; storing the third smart contact from the third party unrelated to the party paying the wages, the third smart contract for paying second wages from a second job of the employee upon receiving a second trigger; and independently executing both the second smart contract and the third smart contract upon receiving the first trigger and the second trigger. In still another illustrative embodiment, method 1400 also includes writing the smart contract such that a third party only can read selected portions of the smart contract from the blockchain. In still another different illustrative embodiment, method 1400 also includes providing a code to a third party, wherein the code serves as a trigger in the smart contract to allow only selected portions of the smart contract on the blockchain to be displayed.

Thus, method 1400 provides an example of redirecting the smart contract so that execution of payroll instructions is an updated version of the smart contract prior to executing the instructions to pay the wages, and modifying payment of the wages according to the modification in the updated smart contract. Each employee is identified by a unique identifier, which can be a hash of some combination of the employee's social security number, name, birth date or other characteristics and can be used to identify smart contracts belonging to the employee. Each smart contract can include a function at the beginning of the instructions to check for an updated version. For example, if the function to check for an updated version finds an updated version of the smart contract for the employee based on the employee unique identifier, the execution at the current smart contract is terminated and the updated version of the smart contract will execute instead. Thus, method 1400 may also include redirecting an updated version of the smart contract from a third party prior to modifying or executing the smart contract.

Yet further in this example, method 1400 may also include redirecting an updated version of the smart contract allowing for calculating an additional withholding based on the modification, withholding the additional withholding from the wages, and paying the additional withholding to an entity specified in the modification to the smart contract. Still further in this example, the modification of an updated version of the smart contract may be as a result of a court order to withhold a portion of the wages. For example, the modification further may include instructions coded to pay the withholding to an account associated with an entity specified in the court order. The court order may be for one of child support, a chapter 13 bankruptcy payment, and a payment on a judgement, and wherein the instructions are coded to pay the additional withholding to a recipient of the child support, the chapter 13 bankruptcy payment, and the payment on the judgement. Still further, to avoid an expired version of a smart contract from being repeatedly executed, an expiration date can be set for the smart contract and, at the time of expiration, if there exists no updated version, a copy of the smart contract is recreated with a new expiration date.

In a different illustrative embodiment, when the employee changes employers or the employee is changed from a salaried employee to a contract employee or a hourly employee or vice versa, the same mechanism is used by providing the employee with an updated version of a payroll smart contact. Much of the smart contract logic can be reused while changing the necessary parameters to reflect the new employer.

In a different illustrative embodiment, if an employee terminates employment prior to the expiration of the smart contract. A "terminate" smart contract becomes the updated version of the smart contract and the payment instructions in the unexpired smart contract will not be executed.

In a different illustrative embodiment, an employee may be simultaneously employed by more than one employer. Multiple payroll smart contracts for one employee can exist simultaneously on the distributed ledger. When one of the smart contracts has an updated version, the updated version references the older version's address and has no effect on other smart contracts for the employee.

In a different illustrative embodiment, a third party, such as the Federal Government or an insurance company, has access only to the portion of data that is relevant to them. For example, the wage data or tax payment amount are visible to the Federal Government and a copy of the data is encrypted with the Federal Government's public key ensuring only the Federal Government can view the data. Alternatively, the Federal Government can be given a token or a code to unlock the data that is visible to them. If the same data is required to be visible to more than one third party, either multiple copies of the data will be provided in the smart contract, each encrypted with the different third party's public key, or a token or code is given to these third parties to view the data.

In a different illustrative embodiment, the withholding may be as a result of a request by at least one of an employer and the employee to withhold the additional portion of the wages. In this case, the modification may be instructions coded in the updated version of the smart contract to pay the additional withholding to an insurance company to pay an insurance premium for the employee. The modification may be instructions coded to pay the additional withholding to a retirement account for the employee.

In yet another illustrative embodiment, the non-transitory computer-recordable storage medium may be located remotely from the server computer. The server computer and the computer are a single computer. The server computer and the computer may be different computers belonging to different entities.

In still another illustrative embodiment, the distributed ledger may be a blockchain. In this case, method 1400 may also include storing off-chain, wage payment information related to payment of the wages and the taxes, wherein off-chain data is created. Furthering this example, method 1200 may also include, after storing the wage payment information, calling, by the smart contract, the off-chain data and processing an additional transaction using the off-chain data.

In still another different illustrative embodiment, the distributed ledger may be a blockchain. In this case, method 1400 may also include storing on-chain, wage payment information related to payment of the wages and tax payment information related to payment of the taxes.

The illustrative embodiments described with respect to FIG. 14 may be further varied. For example, all of the illustrative embodiments described with respect to FIG. 14 may also be implemented as a computer including a processor and a non-transitory computer-recordable storage medium storing computer code which, when executed by the processor, performs the computer-implemented method. Likewise, all of the illustrative embodiments described with respect to FIG. 14 may be implemented as the non-transitory computer-recordable storage medium itself. Yet further illustrative embodiments are possible, such as more or fewer operations being present. Thus, the claimed inventions are not necessarily limited by the examples described with respect to FIG. 14.

FIG. 15 is a block diagram of a data processing system depicted in accordance with an illustrative embodiment. Data processing system 1500 is an example of a computer that may be used to implement any of the illustrative embodiments described with respect to FIG. 1 through FIG. 14.

In this illustrative example, data processing system 1500 includes communications framework 1502, which provides communications between processor unit 1504, memory 1506, persistent storage 1508, communications unit 1510, input/output unit 1512, and display 1514. In this example, communication frameworks 1502 may take the form of a bus system.

Processor unit 1504 serves to execute instructions for software that may be loaded into memory 1506. Processor unit 1504 may be a number of processors, a multi-processor core, or some other type of processor, depending on the particular implementation.

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. The program code may be the software on a non-transitory computer-recordable storage medium usable to implement any of the illustrative embodiments described above. Storage devices 1516 may also be referred to as computer-readable storage devices in these illustrative examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through at least of a keyboard, a mouse, or some other suitable input device. Further, input/output unit 1512 may send output to a printer. Display 1514 provides a mechanism to display information to a user.

Instructions for at least one of the operating system, applications, or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer-usable program code, or computer-readable program code that may be read and executed by a processor in processor unit 1504. The program code in the different embodiments may be embodied on different physical or computer-readable storage media, such as memory 1506 or persistent storage 1508.

Program code 1518 is located in a functional form on computer-readable media 1520 that is selectively removable and may be loaded onto or transferred to data processing system 1500 for execution by processor unit 1504. Program code 1518 and computer-readable media 1520 form computer program product 1522 in these illustrative examples. In one example, computer-readable media 1520 may be computer-readable storage media 1524 or computer-readable signal media 1526.

In these illustrative examples, computer-readable storage media 1524 is a physical or tangible storage device used to store program code 1518 rather than a medium that propagates or transmits program code 1518.

Alternatively, program code 1518 may be transferred to data processing system 1500 using computer-readable signal media 1526. Computer-readable signal media 1526 may be, for example, a propagated data signal containing program code 1518. For example, computer-readable signal media 1526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1500 are not meant to provide architectural limitations to the manner in which different embodiments may be implemented. The different illustrative embodiments may be implemented in a data processing system including components, in addition to or in place of those illustrated, for data processing system 1500. Other components shown in FIG. 15 can be varied from the illustrative examples shown. The different embodiments may be implemented using any hardware device or system capable of running program code 1518.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Many modifications and variations will be apparent to those of ordinary skill in the art. Further, different illustrative embodiments may provide different features, as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

As used herein, the term "server computer" is any computer which operates in the role of a server, whether or not the computer is configured specifically to operate as a "server." As used herein, the term "client computer" is any computer which operates in the roll of a client, whether or not the computer is configured specifically to operate as a "client" or a "workstation."

1. A computer-implemented method of using a distributed ledger maintained solely on at least one non-transitory computer-recordable storage medium in a computer network, the computer-implemented method comprising:
receiving a trigger event at a smart contract stored on the distributed ledger, the smart contract comprising computer code which, when executed by a processor, is configured to automatically execute a transaction upon receipt of predetermined input, the transaction and the trigger event related to payment of wages earned by an employee, the transaction also related to withholding taxes from the payment of the wages;
executing, by a server computer, the smart contract such that the smart contract issues instructions to calculate a tax wage withholding and to cause taxes to be withheld from the wages paid to the employee;
executing, by the server computer, the smart contract such that the smart contract issues instructions to a computer to pay the wages to the employee while withholding the taxes, whereby a modified wage is determined; and
executing, by the computer, the instructions to pay the modified wage to the employee and to pay the taxes to a government entity.

2. The computer-implemented method of claim 1 further comprising:
receiving, at the server computer, the smart contract from a third party different than an entity that operates the server.

3. The computer-implemented method of claim 2, wherein the third party comprises the government entity.

4. The computer-implemented method of claim 1 further comprising:
modifying the smart contract prior to executing the instructions to pay the wages to produce a modification;
updating the smart contract such that an updated smart contract is stored on the blockchain; and
modifying payment of the wages according to the modification.

5. The computer-implemented method of claim 4 further comprising:
receiving a modification to the smart contract from a third party prior to modifying the smart contract.

6. The computer-implemented method of claim 5 further comprising:
calculating an additional withholding based on the modification;
withholding the additional withholding from the ages; and
paying the additional withholding to an entity specified in the modification to the smart contract.

7. The computer-implemented method of claim 6, wherein the modification is as a result of a court order to withhold a portion of the wages.

8. The computer-implemented method of claim 7, wherein the modification further comprises instructions coded to pay the withholding to an account associated with an entity specified in the court order.

9. The computer-implemented method of claim 8, wherein the court order is for one of child support, a chapter 13 bankruptcy payment, and a payment on a judgement, and wherein the instructions are coded to pay the additional withholding to a recipient of the child support, the chapter 13 bankruptcy payment, and the payment on the judgement.

10. The computer-implemented method of claim 6, wherein the additional withholding is as a result of a request by at least one of an employer and the employee to withhold the additional portion of the wages.

11. The computer-implemented method of claim 10, wherein the modification comprises instructions coded to pay the additional withholding to an insurance company to pay an insurance premium for the employee.

12. The computer-implemented method of claim 11, wherein the modification comprises instructions coded to pay the additional withholding to a retirement account for the employee.

13. The computer-implemented method of claim 1, wherein the non-transitory computer-recordable storage medium is located remotely from the server computer.

14. The computer-implemented method of claim 1, wherein the server computer and the computer are a single computer.

15. The computer-implemented method of claim 1, wherein the server computer and the computer are different computers belonging to different entities.

16. The computer-implemented method of claim 1, wherein the distributed ledger comprises a blockchain and wherein the computer-implemented method further comprises:

storing, off-chain, wage payment information related to payment of the wages and the taxes, wherein off-chain data is created.

17. The computer-implemented method of claim 16 further comprising:
after storing the wage payment information, calling, by the smart contract, the off-chain data and processing an additional transaction using the off-chain data.

18. The computer-implemented method of claim 1, wherein the distributed ledger comprises a blockchain, and wherein the computer-implemented method further comprises:
storing, on-chain, wage payment information related to payment of the wages and tax payment information related to payment of the taxes.

19. A computer comprising:
a processor; and
a non-transitory computer recordable storage medium connected to the processor, the non-transitory computer recordable storage medium storing program code, which, when executed by the processor, performs a computer-implemented method of using a distributed ledger maintained solely in a computer network, the computer code comprising:
program code for receiving a trigger event at a smart contract stored on the distributed ledger, the smart contract comprising computer code which, when executed by a processor, is configured to automatically execute a transaction upon receipt of predetermined input, the transaction and the trigger event related to payment of wages earned by an employee, the transaction also related to withholding taxes from the payment of the wages;
program code for executing, by a server computer, the smart contract such that the smart contract issues instructions to calculate a tax wage withholding and to cause taxes to be withheld from the wages paid to the employee;
program code for executing, by the server computer, the smart contract such that the smart contract issues instructions to a computer to pay the wages to the employee while withholding the taxes, whereby a modified wage is determined; and
program code for executing, by the computer, the instructions to pay the modified wage to the employee and to pay the taxes to a government entity.

20. A non-transitory computer-recordable storage medium connected to the processor, the non-transitory computer-recordable storage medium storing program code, which, when executed by a processor, performs a computer-implemented method of using a distributed ledger maintained solely in a computer network, the computer code comprising:
program code for receiving a trigger event at a smart contract stored on the distributed ledger, the smart contract comprising computer code which, when executed by a processor, is configured to automatically execute a transaction upon receipt of predetermined input, the transaction and the trigger event related to payment of wages earned by an employee, the transaction also related to withholding taxes from the payment of the wages;
program code for executing, by a server computer, the smart contract such that the smart contract issues instructions to calculate a tax wage withholding and to cause taxes to be withheld from the wages paid to the employee;
program code for executing, by the server computer, the smart contract such that the smart contract issues instructions to a computer to pay the wages to the employee while withholding the taxes, whereby a modified wage is determined; and
program code for executing, by the computer, the instructions to pay the modified wage to the employee and to pay the taxes to a government entity.

1. A computer-implemented method of using a distributed ledger maintained solely on at least one non-transitory computer-recordable storage medium in a computer network, the computer-implemented method comprising:
receiving a trigger event at a smart contract stored on the distributed ledger, the smart contract comprising computer code which, when executed by a processor, is configured to automatically execute a transaction upon receipt of predetermined input, the transaction and the trigger event related to payment of wages earned by an employee;
executing, by a server computer, the smart contract such that the smart contract issues instructions to a computer to pay the wages to the employee; and
executing, by the computer, the instructions to pay the wages to the employee.

2. The computer-implemented method of claim 1 further comprising:
receiving, at the server computer, the smart contract from a third party different than an entity that operates the server.

3. The computer-implemented method of claim 2, wherein the third party comprises a government entity.

4. The computer-implemented method of claim 1 wherein the smart contract further comprises code which, when executed by the processor, implements a computer-implemented algorithm for tax wage withholding and causes taxes to be withheld from the wages paid to the employee.

5. The computer-implemented method of claim 1 further comprising:
modifying the smart contract prior to executing the instructions to pay the wages; and
modifying payment of the wages according to the modification.

6. The computer-implemented method of claim 5 further comprising:
receiving a modification to the smart contract from a third party prior to modifying the smart contract.

7. The computer-implemented method of claim 6, wherein the modification comprises instructions coded to withhold a portion of the wages, whereby a withholding is formed, wherein the withholding is as a result of a court order to withhold a portion of the wages.

8. The computer-implemented method of claim 7, wherein the modification further comprises instructions coded to pay the withholding to an account associated with an entity specified in the court order.

9. The computer-implemented method of claim 8, wherein the court order is for one of child support, a chapter 13 bankruptcy payment, and a payment on a judgement, and wherein the instructions are coded to pay the withholding to a recipient of the child support, the chapter 13 bankruptcy payment, and the payment on the judgement.

10. The computer-implemented method of claim 6, wherein the modification further comprises instructions coded to withhold a portion of the wages, whereby a withholding is formed, wherein the withholding is as a result of a request by at least one of an employer and the employee to withhold a portion of the wages.

11. The computer-implemented method of claim 10, wherein the modification comprises instructions coded to pay the withholding to an insurance company to pay an insurance premium for the employee.

12. The computer-implemented method of claim 11, wherein the modification comprises instructions coded to pay the withholding to a retirement account for the employee.

13. The computer-implemented method of claim 1 wherein the non-transitory computer-recordable storage medium is located remotely from the server computer.

14. The computer-implemented method of claim 1, wherein the server computer and the computer are a single computer.

15. The computer-implemented method of claim 1, wherein the server computer and the computer are different computers belonging to different entities.

16. The computer-implemented method of claim 1, wherein the distributed ledger comprises a blockchain, and wherein the computer-implemented method further comprises:
   storing, off-chain, wage payment information related to payment of the wages, wherein off-chain data is created.

17. The computer-implemented method of claim 16 further comprising:
   after storing the wage payment information, calling, by the smart contract, the off-chain data and processing an additional transaction and using the off-chain data.

18. The computer-implemented method of claim 1, wherein the distributed ledger comprises a blockchain and wherein the computer-implemented method further comprises:
   storing, on-chain, wage payment information related to payment of the wages.

19. A computer comprising:
   a processor; and
   a non-transitory computer-recordable storage medium, the non-transitory computer recordable storage medium storing computer code which, when executed by the processor, performs a computer-implemented method of using a distributed ledger maintained solely in a computer network, the computer code comprising:
      computer code for receiving a trigger event at a smart contract stored on the distributed ledger, the smart contract comprising computer code which, when executed by a processor, is configured to automatically execute a transaction upon receipt of predetermined input, the transaction and the trigger event related to payment of wages earned by an employee;
      computer code for executing, by a server computer, the smart contract such that the smart contract issues instructions to a computer to pay the wages to the employee; and
      computer code for executing, by the computer, the instructions to pay the wages to the employee.

20. A non-transitory computer-recordable storage medium storing computer code which, when executed by a processor, performs a computer-implemented method of using a distributed ledger maintained solely in a computer network, the computer code comprising:
   computer code for receiving a trigger event at a smart contract stored on the distributed ledger, the smart contract comprising computer code which, when executed by a processor, is configured to automatically execute a transaction upon receipt of predetermined input, the transaction and the trigger event related to payment of wages earned by an employee;
   computer code for executing, by a server computer, the smart contract such that the smart contract issues instructions to a computer to pay the wages to the employee; and
   computer code for executing, by the computer, the instructions to pay the wages to the employee.

What is claimed is:

1. A method comprising:
   improving security and accessibility of data relating to payment of wages by:
      storing a first smart contract on a blockchain maintained in a computer network, wherein:
         the first smart contract contains a first clause in an event of authorized changes to the first smart contract; and
         the first smart contract contains a second clause to pay first wages to an employee upon occurrence of a trigger event, the second clause different than the first clause;
      storing a modification to the first smart contract as a second smart contract on the blockchain prior to executing instructions to pay the first wages, the second smart contract containing a third clause to pay second wages to the employee, wherein the second smart contract is different than the first smart contract; and
   responsive to receiving the trigger event:
      executing the first smart contract, wherein the first clause is executed prior to the second clause; and
      after executing the first clause, executing the second smart contract, whereby the second wages are paid to the employee;
   wherein:
      the blockchain is maintained on non-transitory, computer-readable storage media comprising a distributed ledger implemented by the computer network;
      the first smart contract and the second smart contract are recorded on the blockchain such that the first smart contract and the second smart contract cannot be modified;
      the second wages comprise updated wages; and
   payroll security is improved by paying the updated wages using the blockchain,
   wherein the first clause is a redirection clause.

2. The method of claim 1 further comprising:
   prior to storing the first smart contract on the blockchain, assigning a unique identifier to the employee; and
   storing the unique identifier on the blockchain.

3. The method of claim 2, wherein the unique identifier comprises a hash of a combination of two or more of a social security number of the employee, a name of the employee, a birth date of the employee, a code provided by a third party vendor, and a code provided by the employee.

4. The method of claim 1, wherein both the first smart contract and the second smart contract includes a function at a beginning of corresponding instructions in the first smart contract and the second smart contract to check for an updated version stored later in the blockchain.

5. The method of claim 1 wherein:
   the redirection clause includes calling a sublevel smart contract from a third party.

6. The method of claim 5, wherein:
   the third party comprises a government agency; and
   the sublevel smart contract further includes instructions to withhold taxes payable to the government agency from the updated wages.

7. The method of claim 5, wherein:
   the third party comprises a court; and the sublevel smart contract further includes instructions to withhold a court-ordered payment payable to an entity from the updated wages.

8. The method of claim 7, wherein the court-ordered payment is for one of child support, a chapter 13 bankruptcy payment, and a payment on a judgement.

9. The method of claim 8, wherein:
the first smart contract and the second smart contract comprise expiration clauses that prevent the first smart contract and the second smart contract from being repeatedly executed on the blockchain; and
the blockchain preventing alteration of the first smart contract and the second smart contract ensures security for the expiration clauses.

10. The method of claim 1 further comprising:
prior to storing the first smart contract on the blockchain, assigning a first unique identifier to the employee;
storing the first unique identifier on the blockchain;
assigning and storing a second unique identifier to the employee based on a third smart contract, wherein the third smart contract is from a third party unrelated to a party paying the updated wages;
storing the third smart contract, wherein the third smart contract is for paying second wages from a second job of the employee upon receiving a second trigger; and
independently executing both the second smart contract and the third smart contract upon an occurrence of a first trigger and the second trigger, respectively.

11. The method of claim 1 further comprising:
writing the second smart contract such that a third party can only read selected portions of the second smart contract from the blockchain.

12. The method of claim 1 further comprising:
providing a code to a third party, wherein the code serves as a trigger for the second smart contract to allow only selected portions of the second smart contract on the blockchain to be displayed.

13. A computer comprising:
a processor configured to:
store a first smart contract on a blockchain maintained in a computer network, wherein:
the first smart contract contains a first clause in an event of authorized changes to the first smart contract;
the first clause is a redirection clause; and
the first smart contract contains a second clause to pay first wages to an employee upon receipt of a trigger event;
store a modification of the first smart contract as a second smart contract on the blockchain prior to executing instructions to pay the first wages, the second smart contract containing a third clause to pay second wages to the employee;
receive the trigger event;
execute program code for thereafter executing the first smart contract, including executing the redirection clause prior to executing the second clause; and
execute the second smart contract and direct that the second wages be paid, whereby computer security is increased by providing for payment of updated wages via the blockchain in which the first smart contract and the second smart contract are recorded, such that the first smart contract and the second smart contract cannot be retroactively altered.

14. The computer of claim 13, wherein the processor is further configured to:
store the first smart contract on the blockchain;
assign a unique identifier to the employee; and
store a unique identifier on the blockchain.

15. The computer of claim 14, wherein the unique identifier comprises a hash of a combination of two or more of a social security number of the employee, a name of the employee, a birth date of the employee, a code provided by a third party vendor, and a code provided by the employee.

16. The computer of claim 13, wherein both the first smart contract and the second smart contract includes a function at a beginning of corresponding instructions in the first smart contract and the second smart contract to check for an updated version stored later in the blockchain.

17. A computer program product comprising:
a non-transitory, computer-readable medium including instructions for improving security and accessibility of data stored in a distributed ledger comprising a blockchain, wherein portions of the blockchain are maintained on non-transitory, computer-readable storage media in a computer network, the instructions comprising:
first program code for storing a first smart contract on the blockchain, wherein:
the blockchain prevents alteration of the first smart contract;
the first smart contract contains a redirection clause in an event of authorized changes to the first smart contract; and
the first smart contract contains a second clause to pay first wages to an employee upon receipt of a trigger event;
second program code for storing a second smart contract on the blockchain, the second smart contract comprising a modification to the first smart contract, wherein:
the second smart contract is stored on the blockchain prior to executing instructions to pay the first wages;
the second smart contract contains a clause to pay second wages to the employee; and
the blockchain prevents alteration of the second smart contract;
third program code for, responsive to receiving the trigger event, executing the first smart contract, including executing the redirection clause prior to executing the second clause; and
fourth program code for executing the second smart contract and directing that the second wages be paid, whereby computer security is increased by providing for payment of updated wages via the blockchain in which the first smart contract and the second smart contract are recorded.

18. The computer program product of claim 17, wherein the instructions further comprise:
fifth program code for, prior to storing the first smart contract on the blockchain, assigning a unique identifier to the employee; and
sixth program code for storing the unique identifier on the blockchain.

19. The computer program product of claim 18, wherein the unique identifier comprises a hash of a combination of two or more of a social security number of the employee, a name of the employee, a birth date of the employee, a code provided by a third party vendor, and a code provided by the employee.

20. The computer program product of claim 19, wherein both the first smart contract and the second smart contract include a function at a beginning of corresponding instructions in the first smart contract and the second smart contract to check for an updated version stored later in the blockchain.

21. The method of claim 1, wherein the redirection clause calls a sublevel smart contract from a third party that includes instructions to withhold from the updated wages.

* * * * *